United States Patent [19]

Raidel

[11] Patent Number: 4,902,035
[45] Date of Patent: Feb. 20, 1990

[54] SUSPENSION SYSTEM WITH AXLE SEAT REMOVABLE FROM UNIVERSAL TORQUE BEAM

[76] Inventor: John E. Raidel, Rte. 9, Box 400-M, Springfield, Mo. 65804

[21] Appl. No.: 289,043

[22] Filed: Dec. 23, 1988

Related U.S. Application Data

[63] Continuation-in-part of Ser. No. 10,632, Feb. 4, 1987.

[51] Int. Cl.$^4$ .............................................. B60G 11/26
[52] U.S. Cl. .................................... 280/713; 280/683; 403/109; 403/377
[58] Field of Search ............... 280/683, 688, 702, 711, 280/713, 724, 725; 267/256; 403/109, 110, 289, 290, 377, 378, 309, 313

[56] References Cited

U.S. PATENT DOCUMENTS

| | | | |
|---|---|---|---|
| 3,319,280 | 5/1967 | Trachsler | 403/290 X |
| 3,482,854 | 12/1969 | Masser | 280/713 |
| 4,256,326 | 3/1981 | Cantrell et al. | 280/683 |
| 4,379,572 | 4/1983 | Hedenberg | 280/713 |

Primary Examiner—Charles A. Marmor
Assistant Examiner—Michael Mar
Attorney, Agent, or Firm—& Haferkamp Rogers, Howell

[57] ABSTRACT

A vehicle suspension system having a torque beam pivotally supported from the vehicle chassis and an axle seat assembly connected to an axle with a telescoping connection between the torque rod beam and the axle seat assembly. The axle seat assembly has a telescoping component with slots in its side walls separating the telescoping component into separable sections. Flanges on the upper and lower sections can be connected by bolts. Bars on the torque beam extend through the slots and also can be connected by the bolts. Spaces are provided to span the distance between the bar and the upper and lower flanges to prevent bending of the flanges when the bolts are tightened.

12 Claims, 2 Drawing Sheets

SUSPENSION SYSTEM WITH AXLE SEAT REMOVABLE FROM UNIVERSAL TORQUE BEAM

This application is a continuation-in-part of prior U.S. application Ser. No. 07/010,632 filed 2/4/87.

BACKGROUND OF THE INVENTION

This invention relates to a suspension system that incorporates a torque rod and an axle seat that are connected in a telescoping fit that is easy to install and remove with a conventional hand wrench.

Prior art suspension systems have incorporated various forms of adjustable connections to an axle. The Hedenberg U.S. Pat. No. 4,379,572 discloses what is called a carrier arm that extends to a so-called horizontal platform portion. The overall length of the carrier arm is adjustable by providing a turnbuckle. The carrier arm is formed in separate sections which are joined by an internal circular bar member 82 and the turn buckle 84 allows the overall length to be adjusted (column 6, line 35-51). The Cantrell Pat. No. 4,256,326 incorporates a torque beam 20 that has a stud extending from one end. A sleeve 24 slides on the beam 20 and a nut can be threaded on the stud to adjust the position of the sleeve 24. In both the Hedenberg and Cantrell Patents the sole purpose of the foregoing mechanisms is to provide length adjustability.

The present invention is directed to the mounting of a torque beam on a hanger and the mounting of an axle seat to an axle and more particularly to a novel connection between the torque beam and the axle seat. That connection allows the axle seat to be connected to a universal torque beam that can be used in conjunction with axle seats of other designs, such as those illustrated and described in the aforesaid co-pending Raidel application Ser. No. 010,632, filed Feb. 4, 1987. The present arrangement however provides an easy to fabricate torque beam and axle seat assembly wherein the axle seat can be separated from the torque beam by using a conventional hand wrench. The axle seat is easily knocked loose when it is desired to remove it, even if there are rusted joints.

SUMMARY OF THE INVENTION

The suspension system incorporates a hanger with a torque beam pivotally supported on a bushing that is mounted to the hangar. The bushing may be like the one described and illustrated in the aforesaid Ser. No. 010,632 filed Feb. 4, 1987. A fabricated axle seat is welded to an axle in overslung fashion. The axle seat incorporates a hollow sleeve for receiving the torque beam and the hollow sleeve is formed on its opposite sides with slots that separate the sleeve into upper and lower sections that can flex apart and be drawn together. Plate flanges are welded to the sides of the upper and lower sections above and below the slots and the plates are drilled to receive bolts. Central bars are welded to opposite sides of the torque beam and they likewise are drilled to receive bolts. There are spacers between the flanges on the axle seat and the central bars on the torque beam. Bolts extend through the flanges and through the spacers. The spacers are of a thickness that allows the flanges to be tightened against the bars but prevent their bending beyond their elastic limits and becoming deformed. The bolts and their nuts can be connected by conventional hand wrenches. For removal of the axle seat, the bolts and nuts can be removed. If the assembly is stuck because of rusting, the separable sections of the axle seat can be pried or hammered apart to break the rusted joints loose.

DETAILED DESCRIPTION OF THE INVENTION

Figure 2:
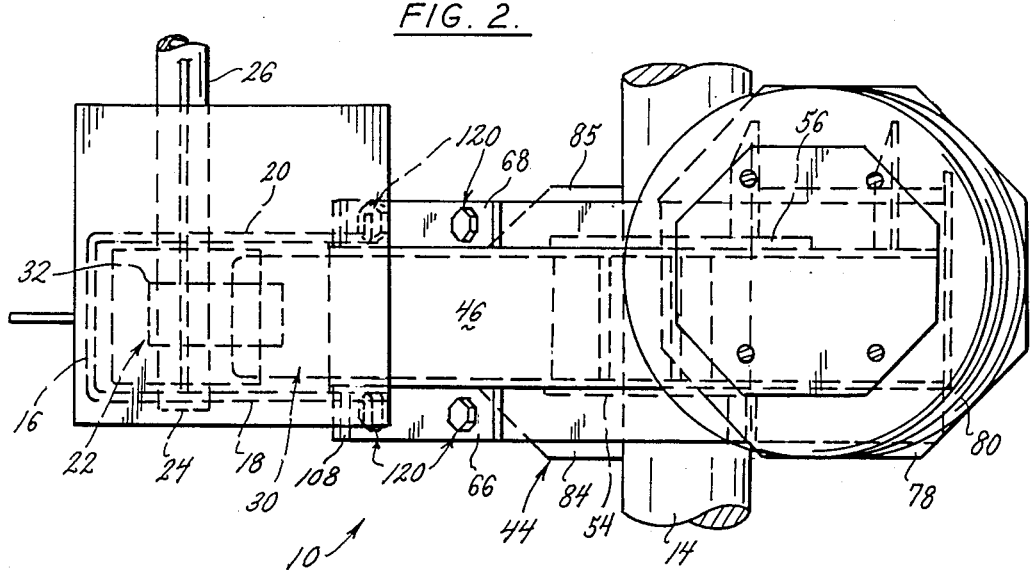
FIG. 2 is a top plan view of the suspension system of FIG. 1.

The suspension system 10 is installed on a vehicle chassis 12 that incorporates an axle 14. A hanger 16 is suspended downwardly from the chassis 12. The hanger 16 is formed with side plates 18 and 20 between which an eccentric busing assembly 22 is mounted on an eccentric bolt 24. The eccentric bushing assembly 22 and its bolt 24 may be like the one described and illustrated in the aforesaid U.S. patent application Ser. No. 010,632 filed Feb. 4, 1987. The stabilizer bar 26 extends between the hanger 16 and a like hanger on the opposite side of the vehicle.

A torque beam 30 has an end 32 that is mounted on the bushing 22. Preferably as particularly illustrated in FIGS. 5 and 6, the torque beam 30 is rectangular with a top 34, a bottom 36 and opposite sides 38 and 40.

An axle seat assembly 44 comprises an inverted channel member 46 that has a top wall 48 and side walls 50 and 52. There are reenforcing side plates 54 and 56 welded to the side walls 50 and 52. The side walls 50 and 52 have arcuate cutouts 58, and the reenforcing plates 54 and 56 have similar arcuate cutouts 60 where they are respectively welded to the axle 40. Each side plate 54 and 56 has a leading edge 62. An upper flange 66 is welded to the side wall 50 and a similar flange 68 is welded to the side wall 52. Each flange 66 and 68 has a downwardly and rearwardly inclined rear section 70, a central section 72, a bridging section 74, and a forward section 76. A spring mounting plate 78 is welded to the rear sections 70 so that an air spring 80 can be mounted between the plate 78 and the chassis 12 in a manner known in the art.

Figure 5:
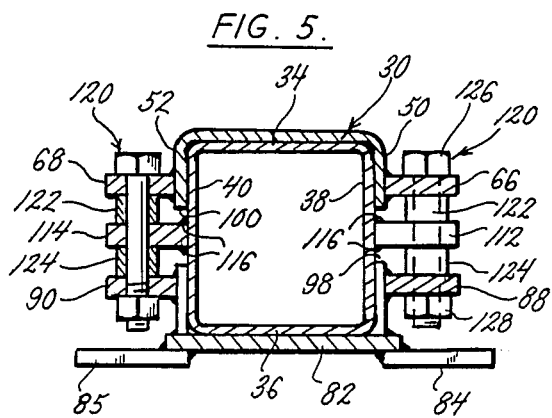
FIG. 5 is an enlarged view in section taken along the plane of the line 5—5 of FIG. 1.
Figure 6:
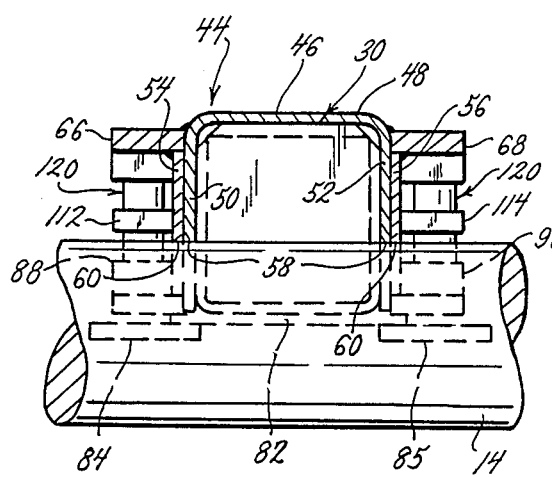
FIG. 6 is an enlarged view in section taken along the plane of the line 6—6 of FIG. 1.
Figure 4:
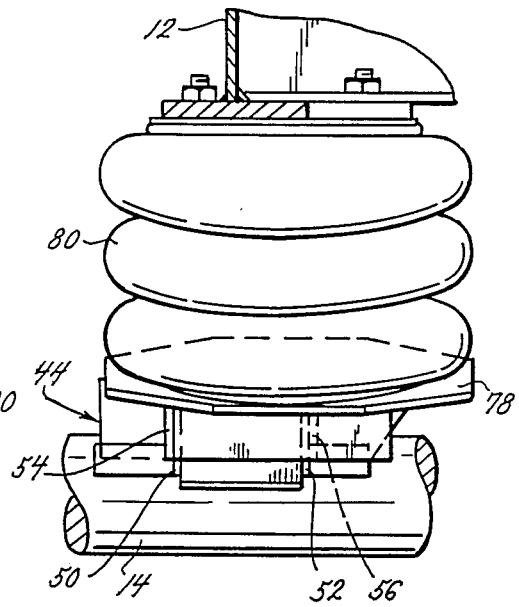
FIG. 4 is a view is section taken along the plane of the line 4—4 of FIG. 1.

Forward of the axle 14, a bottom plate 82 is welded to the lower edges of the side walls 50 and 52. As shown in FIGS. 5 and 6, there are reenforcing plates 84 an 85 welded between the bottom plate 82 and the axle 14. A lower flange 88 is welded to the side wall 50 and another lower flange 90 is welded to the side wall 52. Each flange 88 and 90 has a rearward section 92 and a forward section 94. The sections 94 are spaced below and parallel to the sections 76 of the upper flanges 66 and 68.

Figure 1:
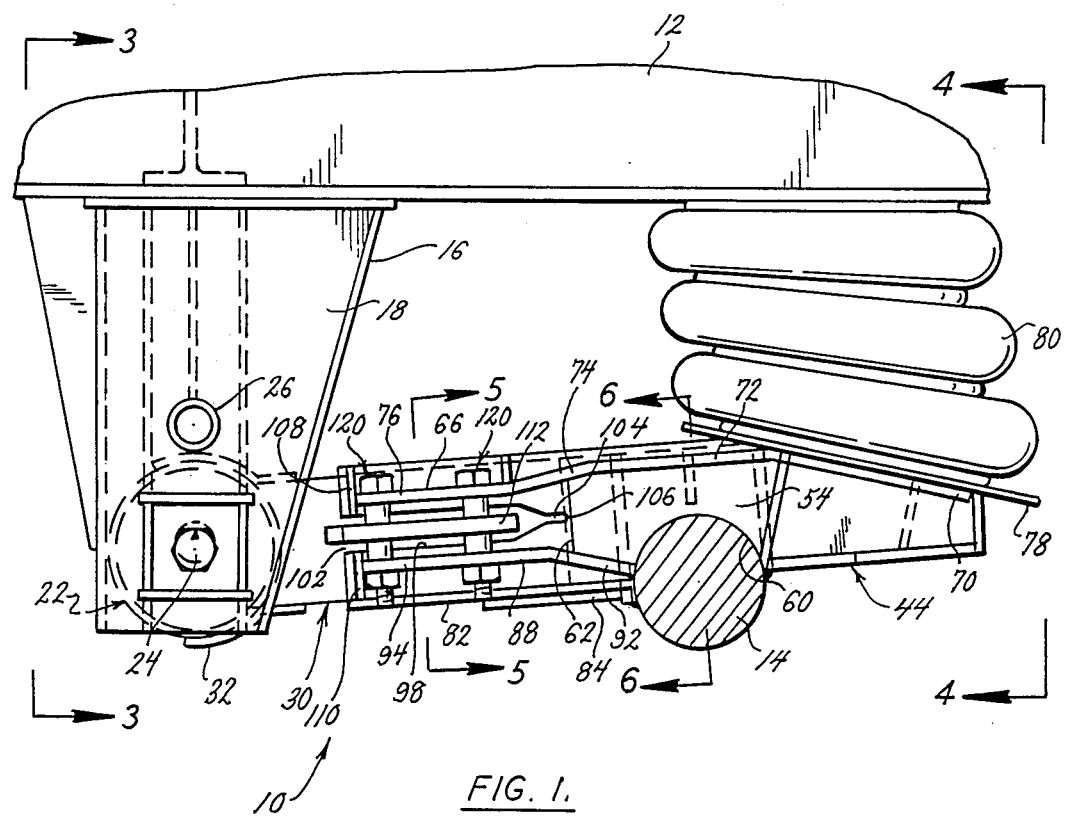
FIG. 1 is a side elevation view of the suspension system of this invention.
Figure 3:
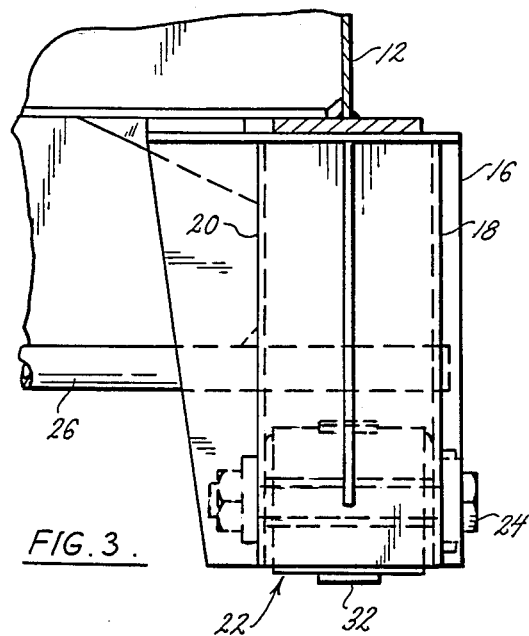
FIG. 3 is a view in section taken along the plane of the line 3—3 of FIG. 1.

As illustrated in FIG. 5, there are slots 98 and 100 in the side walls 50 and 52 respectively. As shown in FIG. 1, each slot has a forward end 102 opening through the front of the respective side wall 50 or 52 and has a narrow rearward end 104 that has an arcuate termination 106 generally aligned with the edge 62 of the reenforcing plate 54 or 56. Above the slot 98, there are forward reenforcing plates 108 welded to the side walls 50 and 52 and to the flange sections 76. Below the slot 98, there are similar reenforcing walls 110 welded to the side walls 50 and 52 and to the flange sections 94. On opposite sides of the torque beam 30, there are bars 112 and 114 joined by weldments 116 to the side walls 38 and 40 respectively. The slots 98 and 100 are wide enough to accommodate the bars 112 and 114 and their weldments 116, as is clearly shown in FIG. 5. When the bars 112 and 114 project through the slots 98 and 100, they are spaced between the upper and lower flanges 66 and 84 on one side and 88 and 90 on the other side.

The axle seat assembly 44 can be connected to the torque beam 30 by a plurality of bolt and spacer assemblies 120. Each bolt and spacer assembly comprises an upper spacer 122, a lower spacer 124, and a bolt 126 and nut 128. An upper spacer 122 is positioned between an upper flange 66 or 68 and a bar 112 or 114. A lower spacer 124 is positioned between a bar 112 or 114 and a lower flange 88 or 90. A bolt 126 is long enough to extend through an upper flange 66 or 68, a spacer 122, a bar 112 or 114, a spacer 124, and a lower flange 88 or 90, to be tightened by a nut 128. The spacers 122 and 124 allow the bolt 126 and nut 128 to be tightened an amount that will firmly press the upper and lower sections of the axle seat above and below the slots 98 and 100 against the torque beam 30. Yet, the spacers 122 and 124 prevent the flanges 66, 88, 68 and 90 from bending out of shape.

This suspension system 10 is readily installed. The torque beam 30 can be used with the axle seat assembly 44 or with other axle seat assemblies. To be used with the axle seat assembly 44, the torque beam 30 is provided with the lateral bars 112 and 114 that are joined to the side walls 38 and 40 by the weldments 116. Next, the axle seat assembly 44 can be telescopingly fitted onto the torque beam 30. The slots 98 and 100 allow the upper and lower sections of the axle seat above and below the slots 98 and 100 to yield apart to receive the torque beam 30. This yieldability is enhanced by the narrow slot section 104 while the arcuate end 106 prevents the formation of stress cracks. The slots 98 and 100 are wide enough to receive the bars 112 and 114 (typically made of ⅜" bar stock) and their weldments 116. This width of the slots 98 and 100 and the required welding of the flange sections 94 require that the flange sections 94 be spaced apart a substantial distance (on the order of 2⅛"). With the bolt and sleeve assemblies 120, the axle seat assembly 44 and the torque beam 30 can be tightly connected together as previously described. This assembly requires only conventional hand wrenches. After the torque beam 30 and axle seat assembly 44 are joined together, the bushing 22 and its eccentric bolt 24 can be mounted in place to install the torque beam 30 on the hanger 16.

To disassemble the torque beam 30 and axle seat assembly 44, such as for servicing, the eccentric bolt 24 is removed so that the bushing 22 and the forward end of the torque beam 30 can be dropped below the hanger 16. Using conventional hand wrenches, the bolt and sleeve assemblies 120 are removed. Then, if there are any areas that are joined tightly by rusting, the pry bar can be used to loosen them.

It will be apparent from the foregoing description that the fabrication of this axle seat assembly 44 and its torque beam 30 are easily and inexpensively accomplished. Yet, the installation and assembly or disassembly of the torque beam 30 and axle seat assembly 44 are accomplished readily.

There are various changes and modifications which may be made to the invention as would be apparent to those skilled in the art. However, these changes or modifications are included in the teaching of the disclosure, and it is intended that the invention be limited only by the scope of the claims appended hereto.

I claim:

1. A vehicle suspension system for a vehicle having a chassis and an axle comprising a torque beam having a first end and a second end, means for supporting the first end of the torque beam from the chassis, an axle seat assembly, means for connecting the axle seat assembly to the axle, spring means connected between the axle seat assembly and the chassis, and a telescoping component on the axle seat assembly adapted to telescopingly fit onto the second end of the torque beam, said telescoping component including separated sections of the axle seat assembly having opposed flanges spaced from one another, a plurality of bolts and spacers for connecting the opposed flanges of the axle seat assembly with the spacers positioned between the flanges to prevent excess bending of the flanges upon tightening the bolts, and means on said torque beam engageable with the bolts for positively locking the telescoping component against sliding movement relative to the torque beam.

2. The vehicle suspension system of claim 1 including slots in the sides of the telescoping component with the separated sections on opposite sides of the slots, and said last named means comprising bars welded to opposite sides of the torque beam for extending through the slots, the spacers being positioned on opposite sides of each bar and the bolts extending through the flanges, the spacers and the bars.

3. The vehicle suspension system of claim 1 wherein the torque beam is rectangular and the telescoping component of the axle seat assembly is rectangular.

4. The vehicle suspension system of claim 2 wherein the slots are wide enough to accommodate the bars and weldments which attach the bars to the torque beam.

5. The vehicle suspension system of claim 2 wherein each slot has an open end and a closed end and including a narrow section at the closed end of each slot.

6. The vehicle suspension system of claim 5 wherein each narrow section terminates in an arcuate edge.

7. The vehicle suspension system of claim 1 wherein the axle seat assembly is welded to the axle.

8. The vehicle suspension system of claim 7 wherein the axle seat assembly is overslung relative to the axle.

9. The vehicle suspension system of claim 1 wherein the spring means comprises an air spring.

10. The vehicle suspension system of claim 2 wherein there are two bolts and four spacers on each side of the axle seat assembly.

11. A vehicle suspension system for a vehicle having a chassis and an axle comprising a torque beam means for pivotally supporting the torque beam from the chassis, an axle seat assembly, means for connecting the axle seat assembly to the axle, spring means mounted between the axle seat assembly and the chassis, the axle seat assembly having a telescoping component defined by a top wall, a bottom wall and two side walls and having an open end, a slot in each side wall extending from said open end, upper and lower flanges projecting from each side wall above and below the slot, the torque beam having a top wall, a bottom wall and two side walls for insertion into said telescoping component, a bar welded to each torque beam side wall for projecting through one of the slots and intermediate an upper flange and a lower flange, a plurality of spacers sized to fit between opposite sides of each bar and the adjacent upper and lower flanges, and means for connecting the flanges, spacers and bars together on each side of the axle seat assembly.

12. The vehicle suspension system of claim 11 wherein the connecting means comprise bolts, the spacers are cylindrical for receiving the bolts, and the flanges and bars have holes for receiving the bolts.

* * * * *